United States Patent [19]

Oldengott et al.

[11] Patent Number: 4,881,691

[45] Date of Patent: * Nov. 21, 1989

[54] TRANSFER STATION WITH LIFTING DEVICES

[75] Inventors: Michael Oldengott, Witten; Jörg Schade, Herten; Peter Stephan, Oer-Erkenschwick, all of Fed. Rep. of Germany

[73] Assignee: Klockner-Becorit GmbH, Castrop-Rauxel, Fed. Rep. of Germany

[*] Notice: The portion of the term of this patent subsequent to Jun. 2, 2004 has been disclaimed.

[21] Appl. No.: 111,131

[22] Filed: Oct. 22, 1987

Related U.S. Application Data

[63] Continuation of Ser. No. 837,292, Mar. 7, 1986, abandoned.

[30] Foreign Application Priority Data

Mar. 13, 1985 [DE] Fed. Rep. of Germany ....... 3508890

[51] Int. Cl.⁴ .............................................. B02C 23/02
[52] U.S. Cl. ............................... 241/101.5; 241/101.7; 241/285 R; 414/574
[58] Field of Search ............... 241/101.7, 101.5, 101.1, 241/101.2, 285 R; 414/376, 573, 574, 327; 198/302, 311, 535, 536, 540, 547, 735

[56] References Cited

U.S. PATENT DOCUMENTS

| Re. 28,125 | 8/1974 | Quinn | 241/101.7 X |
|---|---|---|---|
| 3,335,968 | 8/1967 | Young | 241/101.7 X |
| 4,585,179 | 4/1986 | Tsuji et al. | 241/101.7 |
| 4,669,674 | 6/1987 | Oldengott et al. | 241/101.7 |
| 4,721,201 | 1/1988 | Oldengott et al. | 414/574 X |

FOREIGN PATENT DOCUMENTS

| 2731424 | 1/1979 | Fed. Rep. of Germany ... 241/101.7 |
|---|---|---|
| 3228735 | 2/1984 | Fed. Rep. of Germany ... 241/101.7 |
| 758372 | 10/1956 | United Kingdom . |
| 2092915 | 8/1982 | United Kingdom ............. 241/101.7 |
| 2141636 | 1/1985 | United Kingdom ............. 241/101.7 |

*Primary Examiner*—Joseph M. Gorski
*Attorney, Agent, or Firm*—Watson, Cole, Grindle & Watson

[57] ABSTRACT

A transfer station which includes an elongated main frame, a conveyor movably mounted in the elongated main frame; a feeder box comprising opposite feed devices connected to opposite sides of the elongated main frame, each feeder device including a box compartment which can be tilted to discharge debris deposited therein onto the moving conveyor; a crusher mechanism for crushing debris carried thereto by the moving conveyor; a discharge chute for discharging the crushed debris into a hauling device; and lifting devices attached to the elongated main frame to lower it onto the ground and place the transfer station in a lowered, operational mode, or raise it above the ground and place the transfer station in an elevated transport mode. Once the transfer station is in its elevated, transport mode a caterpillar tractor can be positioned under the elongated main frame to transport the transfer station to another processing location.

7 Claims, 6 Drawing Sheets

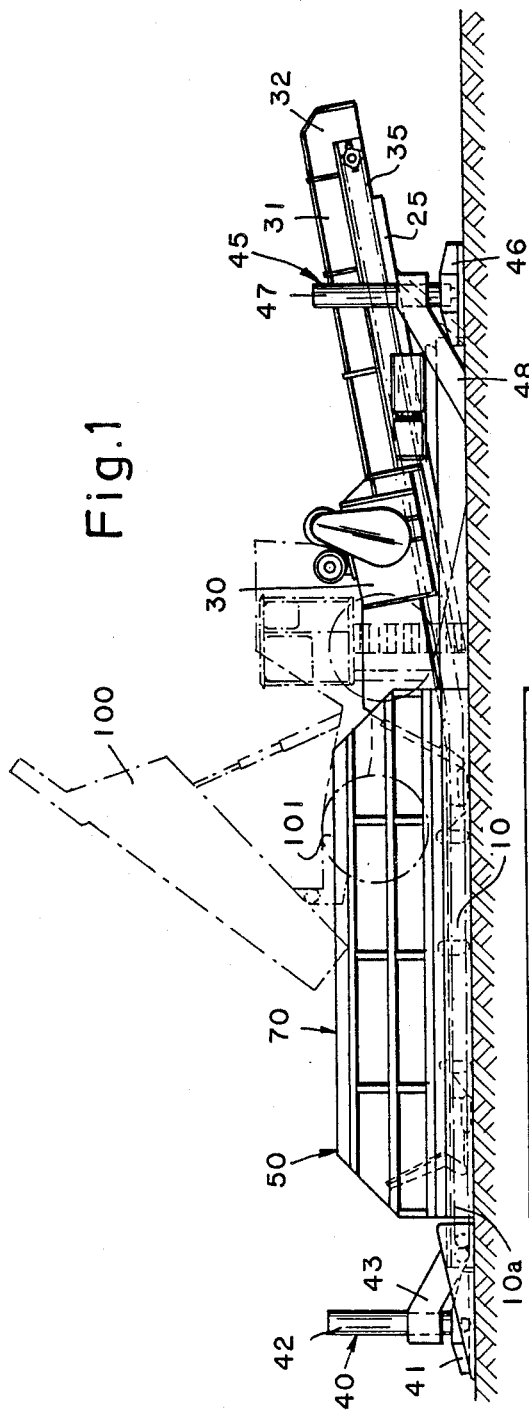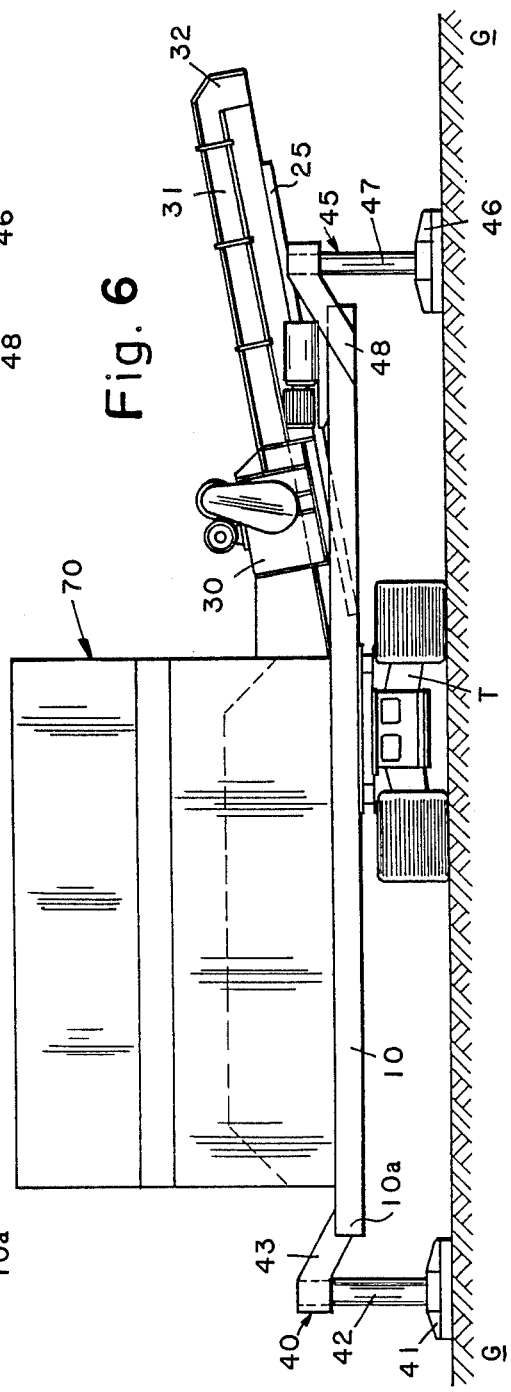

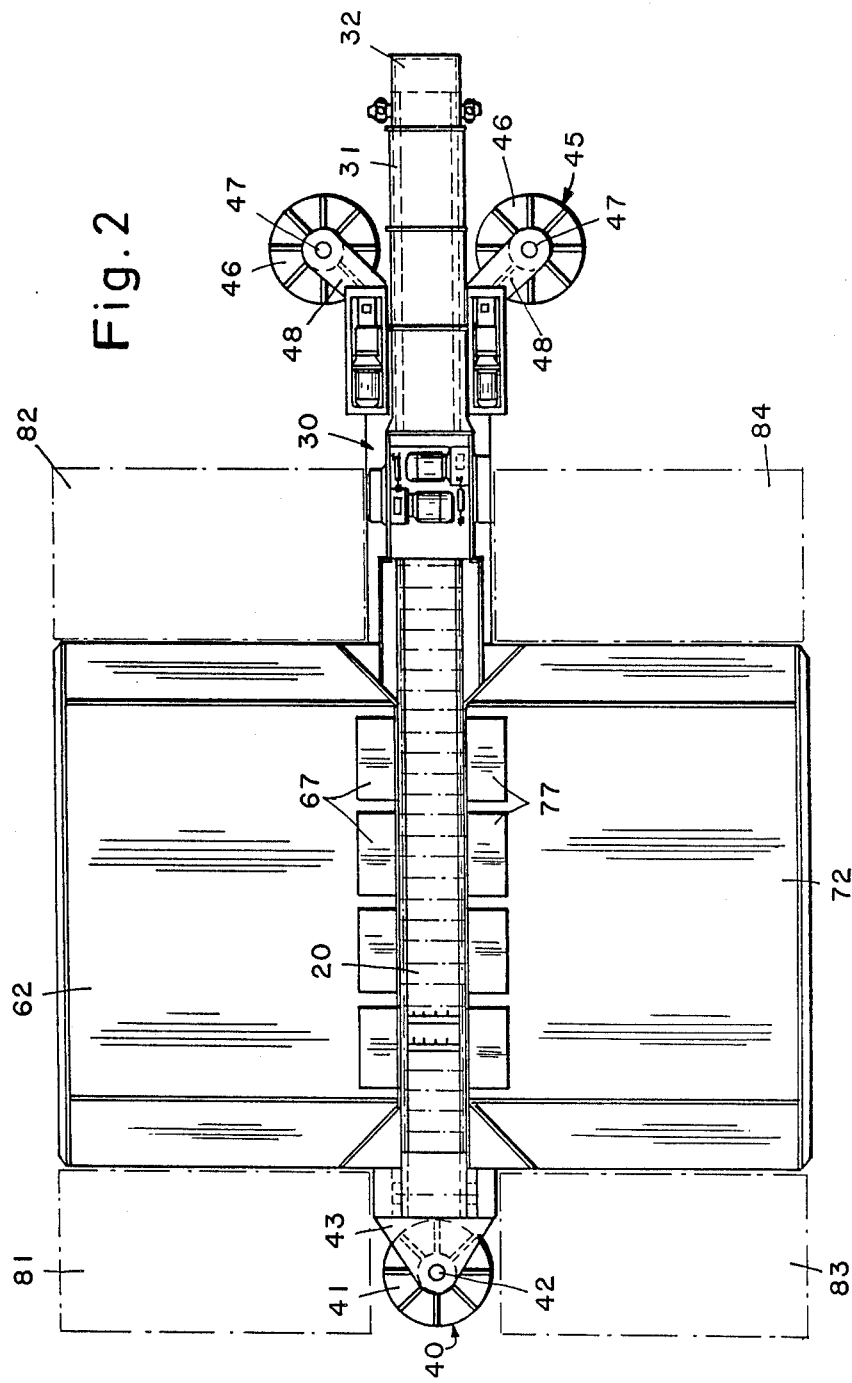

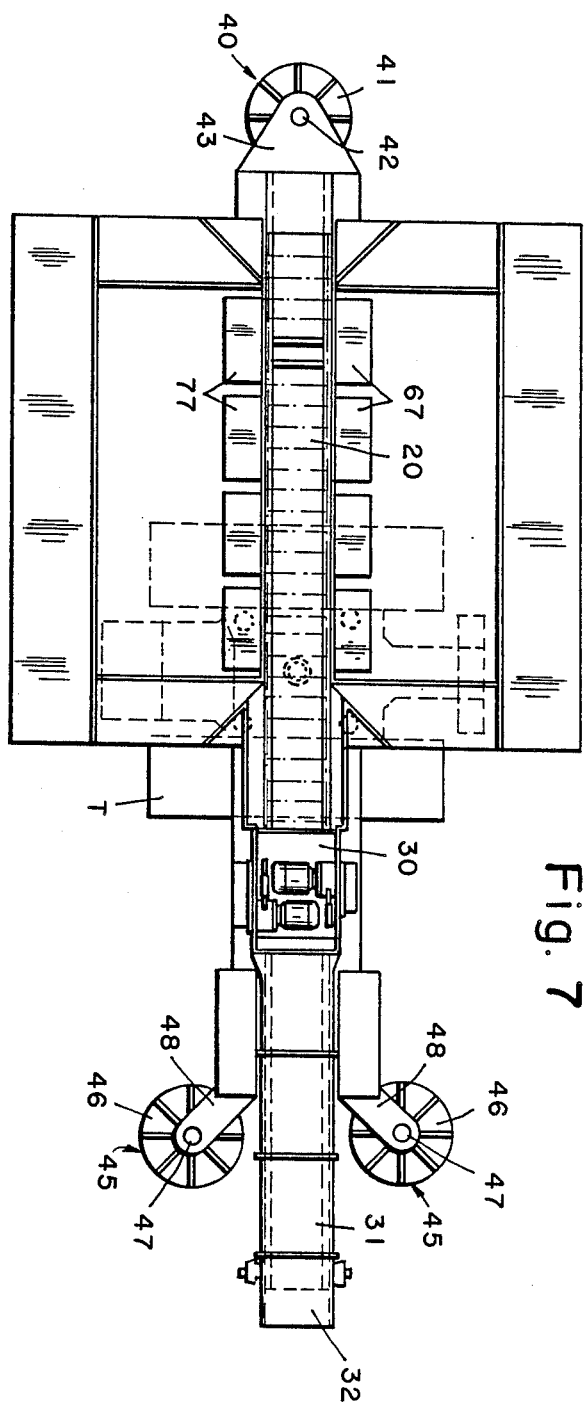

TRANSFER STATION WITH LIFTING DEVICES

This application is a continuation of application Ser. No. 837,292, filed Mar. 7, 1986, now abandoned.

BACKGROUND OF THE INVENTION

1. Field of the Invention

The present invention relates to transfer stations which are used for the on-site processing of bulk materials prior to being hauled away.

2. The Prior Art

One type of known transfer station is disclosed in U.S. patent application Ser. No. 662,036, filed Oct. 18, 1984, now U.S. Pat. No. 4,669,674. It includes separate feeder devices located on opposite sides of an endless conveyor, each feeder device including a box compartment which can receive bulk materials to be processed and which can be tilted to discharge the bulk materials onto the conveyor. The conveyor transports the bulk materials through a crusher mechanism and then down a connecting trough to a discharge mouth where the crushed materials are discharged onto a haul-away device in the form of a transversely-oriented conveyor. Although this transfer station is effective in treating bulk materials, it must be dismantled in order to be moved from one processing site to another. Such a dismantling is disadvantageous because it requires a great deal of time and effort.

Another type of known transfer station is disclosed in U.S. patent application Ser. No. 693,201, filed Jan. 22, 1985, now abandoned. It includes a feeder box which is mounted on an undercarriage support structure and which is divided into two box compartments by interior walls, and two conveyor devices which respectively extend through the box compartments to convey bulk materials to be processed to separate crushers. The undercarriage support structure is permanently supported by two caterpillar treads.

The present invention is directed to a transfer station which is improved in various ways over the above-noted known transfer stations.

SUMMARY OF THE INVENTION

The transfer station of the present invention is of the type which includes separate box compartments which can be tilted to dump materials to be processed onto a moving conveyor, yet can be transported as a unitary structure from one site to another. It includes an elongated frame; a movable conveyor mounted in the elongated frame; a crusher mechanism located above the elongated frame for crushing bulk materials supplied thereto by the conveyor; a feeder box comprising separate feeder devices located on opposite sides of the elongated frame, each feeder device including a ground plate pivotally connected to the elongated frame, a box compartment located above the ground plate and pivotally connected to the elongated frame so as to be tilatble with respect thereto; and a hydraulic cylinder connected between the ground plate and the box compartment; and lifting devices attached to the elongated frame to lower the frame onto the ground, such that the transfer station will be in a lowered, operational mode, or to lift the frame above the ground, such that the transfer station will be in an elevated, transport mode. When in its elevated, transport mode a transport means such as a caterpillar tractor can be moved thereunder and the elongated frame lowered thereon, such that the transport means can move the transfer station to another processing location as a unitary structure. Each of the feeder boxes can advantageously include guide blocks which help retain bulk materials therein when in a non-tilted orientation and to help discharge them onto the conveyor when in a tilted orientation, these guide blocks also being useful for locking the box compartments in their tilted orientation to thus facilitate transport of the transfer station from one site to another on the transport means.

Further features and advantages of the present invention will become apparent by reference to the accompanying drawings, taken in conjunction with the following discussion.

DESCRIPTION OF THE DRAWINGS

In the drawings,

FIG. 1 shows a schematic view of a preferred embodiment of transfer station according to the present invention, the transfer station being in its lowered, operational mode on the ground and the box compartments of the left and right feeder devices of its feeder box being in their non-tilted orientations, FIG. 2 shows a schematic plan view of the transfer station shown in FIG. 1, FIG. 6 shows a schematic side view of the transfer station shown in FIG. 1 when in its elevated, transport mode and as mounted on a caterpillar tractor, the box compartments of the left and right feeder devices being in their tilted orientations and the ground plates thereunder also being upwardly pivoted, FIG. 7 shows a schematic plan view of the transfer station shown in FIG. 6.

DETAILED DESCRIPTION OF THE PREFERRED EMBODIMENT

Figure 3:
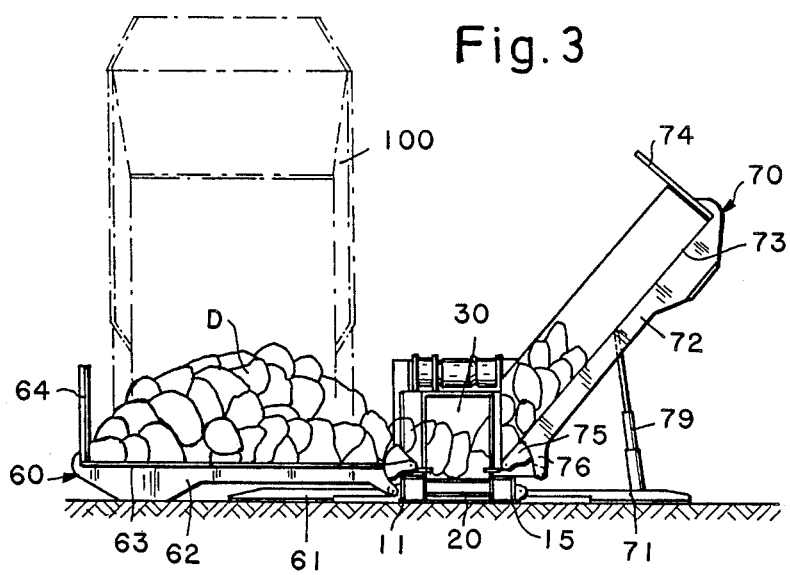
FIG. 3 shows a schematic front end view of the transfer station shown in FIG. 1, but wherein the box compartment of the right feeder device is in its tilted orientation.
Figure 8:
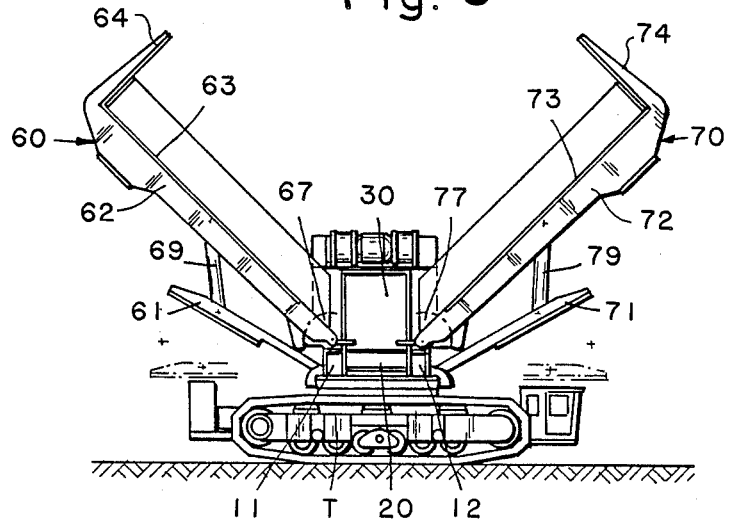
FIG. 8 shows a schematic front end view of the transfer station shown in FIG. 7.
Figure 4:
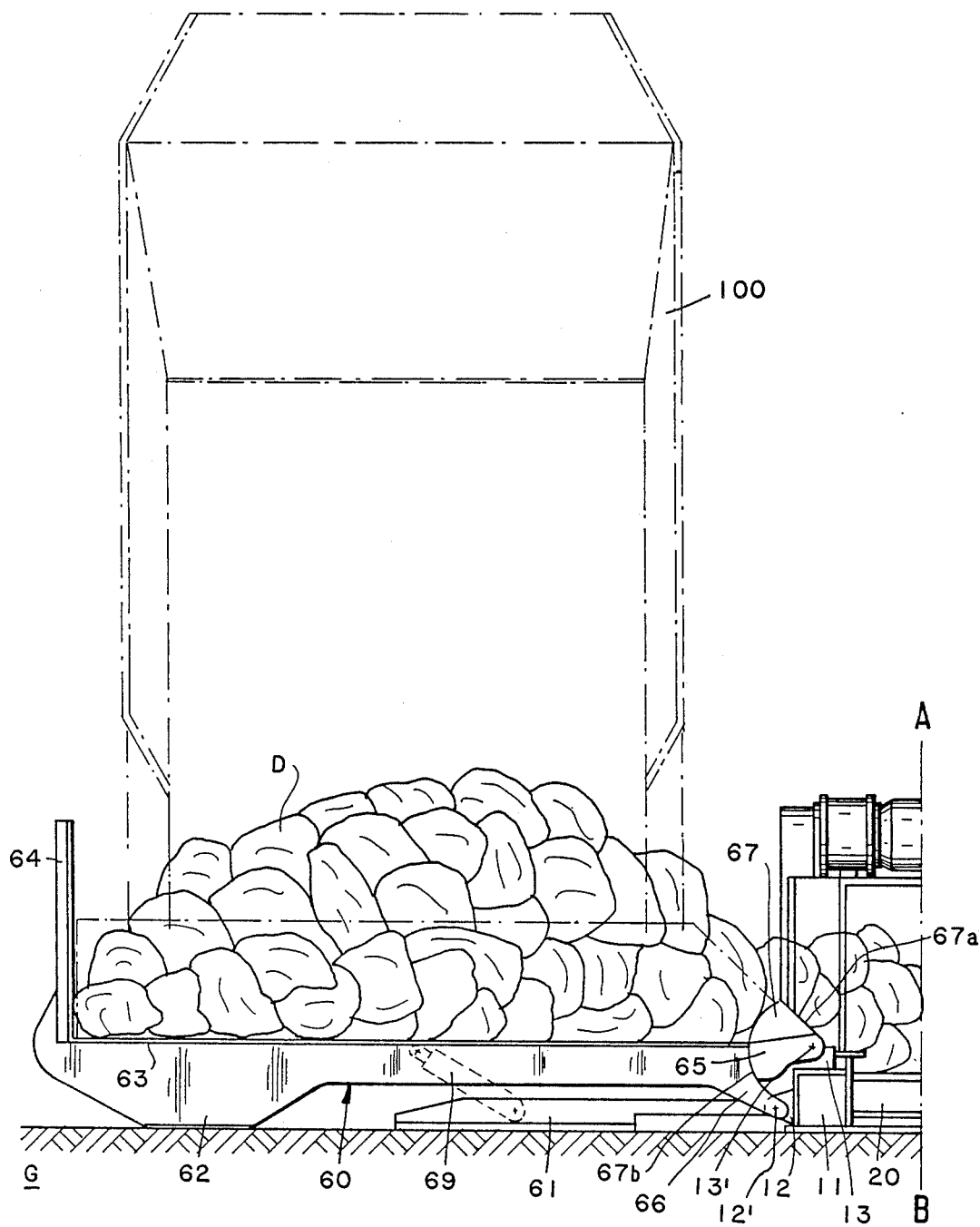
FIG. 4 shows the left half of FIG. 3 on an enlarged scale.
Figure 5:
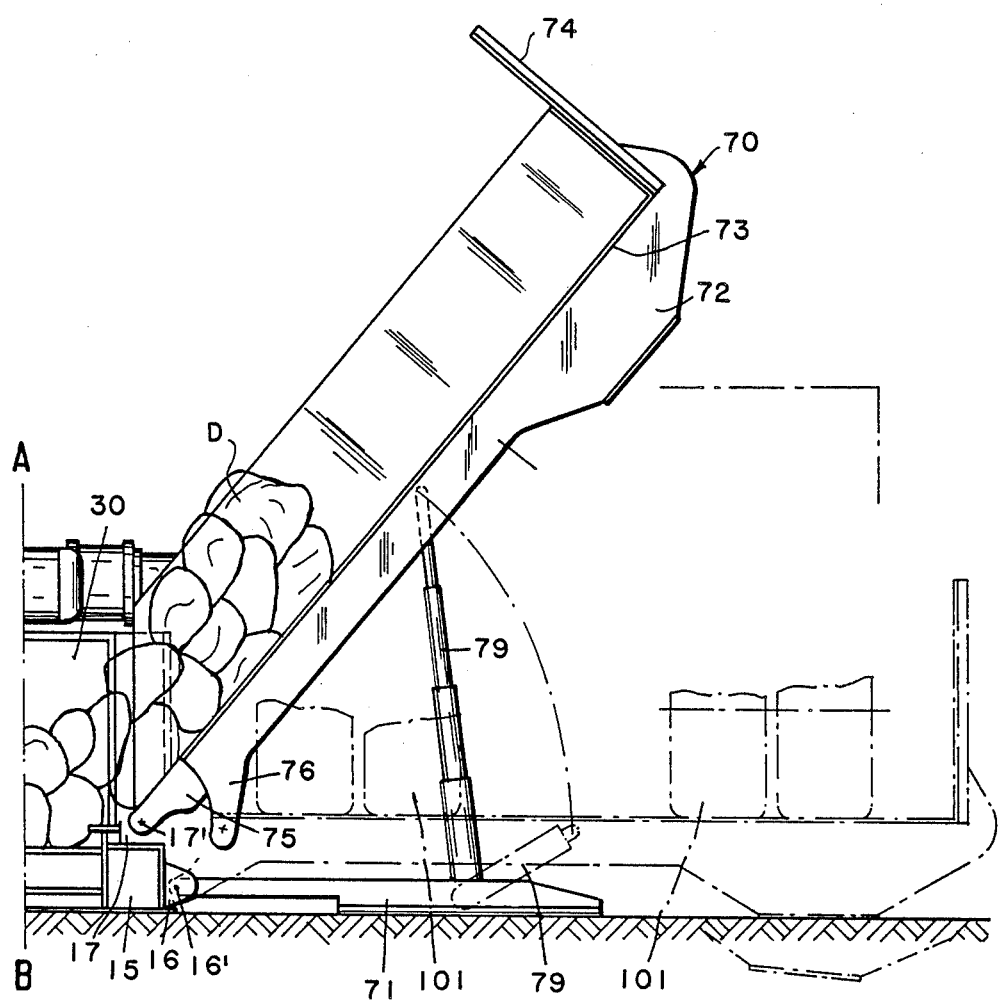
FIG. 5 shows the right half of FIG. 3 on an enlarged scale.

A transfer station according to a preferred embodiment of the present invention is shown in FIGS. 1-8, FIGS. 1-5 showing the transfer station in its lowered, operational mode and FIGS. 6-8 showing the transfer station in its elevated, transport mode (and mounted on a caterpillar tractor).

The transfer station comprises an elongated main frame 10 which includes rectilinear beam members 11 and 15, the elongated main frame having a front end 10a and rear end 10b. Extending outwardly from the sides of the beam members are hinge brackets 12,16 which provide first hinge axes 12',16' that extend in parallel with the beam members, and extending above the beam members are hinge flanges 13,17 which provide second hinge axes 13',17' that also extend in parallel with the beam members. Mounted between the beam members is an endless conveyor 20 which has an upper run that is movable from the front end 10a toward the rear end 10b of the elongated main frame. A secondary frame 25 is mounted on the main frame 10 and extends upwardly at an acute angle to terminate at a free end 26 located beyond the rear end 10b of the elongated main frame. A crusher mechanism 30 is mounted above the secondary frame, as is a discharge chute 31 which extends from the crusher mechanism to a downwardly-directed discharge mouth 32 beyond the free end 26. Crushed material is discharged from discharge mouth 32 into a suitable hauling device (not shown). An endless connecting belt 35 moves material along the discharge chute 31 to the discharge mouth 32.

As best seen in FIGS. 2 and 7, the transfer station also includes a single hydraulic lifting device 40 adjacent the front end 10a of the elongated main frame 10 and two hydraulic lifting devices 45 adjacent the rear end 10b thereof. Each of the hydraulic lifting devices includes a ground-engaging base 41,46, a vertical cylinder 42,47 and a lifting arm 43,48. The lifting arm 43 of lifting device 40 is fixedly connected to the front end 10a of the elongated main frame 10 and each of the lifting arms 48 of the lifting devices 45 are fixedly connected to the rear end 10b of the elongated main frame 10.

A feeder box 50 is located at the front end 10a of the elongated main frame 10, the feeder box including a left feeder device 60 and a right feeder device 70. Each of these two feeder devices include a ground plate 61,71, each being connected to the respective hinge bracket 12,16 so as to be pivotable about the respective hinge axis 12',16'; a box compartment 62,72 positioned above its respective ground plate 61,71, and a hydraulic cylinder 69,79 connected between the ground plate and the respective box compartment therabove. Each box compartment includes a floor 63,73, an outer side wall 64,74, a plurality of support arms 65,75 which are attached to hinge flanges 13,17 to pivot about the respective hinge axis 13',17', and curved lock arms 66,76 which extend downwardly below the support arms 65,75. The front and rear sides of the box compartments are open. The curved lock arms 66,76 include holes near their ends through which pins (not shown) can be inserted. Each of the feeder devices also includes spaced apart guide blocks 67,77 which are also connected to the hinge flanges 13,17 to pivot about the hinge axis 13',17', each guide block having a generally flat upper surface 67a,77a and a curved retainer surface 67b,77b facing away from the adjacent beam member. Each guide block includes a hole (not shown) which can receive a pin that has been extended through a hole in an adjacent lock arm of the associated box compartment when the box compartment has been raised to its tilted orientation.

The inventive transfer device also includes ramps 81, 82, 83 and 84 which are usable when the transfer station is in its lowered, operational mode and when the box compartments 62,72 are in their non-tilted orientations. More specifically, ramps 81 and 82 are respectively attached to the front and rear ends of box compartment 62 to be positionable on the ground G and the ramps 83 and 84 are respectively attached to the front and rear ends of box compartment 72 to be positionable on the ground G. These ramps enable a dump truck 100 with wheels 101 to drive up onto the floor of either of the box compartments via either its front or rear ends in order to dump its load of debris, and then to drive out of the box compartment, i.e., in the same direction as its entry direction.

The two positional modes of the transfer station are depicted in the Figures. In FIGS. 1–5 the transfer station is in its lowered, operational mode (i.e., because no elements of the transfer station extend below the elongated main frame, the elongated main frame 10 rests on ground G), and the box compartment 62 (which is in its non-tilted orientation), contains a load of debris D deposited by dump truck 100. In this orientation the retainer surfaces 67b of the guide blocks 67 function to help retain the debris in the box compartment. The box compartment 72 is in its tilted orientation (achieved by extending the hydraulic cylinder 79), and debris D therein is shown sliding over the generally flat surfaces 77a of the guide blocks 77 to fall onto the moving upper run of the endless conveyor 20. In FIGS. 6–8 the transfer station is in its elevated, transport mode, the frame 10 having been raised above the ground G by the hydraulic lifting devices 40 and 45. A caterpillar tractor T is shown positioned below the elongated main frame 10. In addition, the box compartments 62,72 are in their tilted orientations and the ground plates 61,71 are likewise upwardly pivoted, this being achieved by retracting the hydraulic cylinders 67,79 after the box compartments have been locked in their tilted orientations, i.e., by inserting pins (not shown) through the holes in at least some of the curved lock arms 66,76 thereof and into the corresponding holes in the guide blocks 67,77. The hydraulic lifting devices 40 and 45 can be retracted somewhat to lift the ground-engaging bases 40 and 46 off the ground and thereby enable the caterpillar tractor to move the transfer device to another processing location.

Although a preferred embodiment of the inventive transfer station has been shown and described, it will be apparent that many modifications therein can be made and still fall within the scope of the appended claims.

We claim:

1. A transfer station for processing debris which comprises a unitary, rigid elongated main frame which includes two parallel, rectilinear beam members and defines a front end and a rear end; a conveyor which is movably mounted between said rectilinear beam members of said frame; a crusher mechanism mounted above said elongated main frame for crushing debris deposited on said conveyor; a feeder box positioned at said front end of said elongated main frame, said feeder box including separate feeder devices located on opposite sides of said elongated frame, each feeder device including a box compartment which is pivotally connected to said elongated main frame to be in either a non-tilted or in a tilted orientation, a ground plate below the box compartment which is pivotally connected to said elongated main frame so as to pivot about an axis extending in parallel with said elongated main frame, and a hydraulic cylinder connected between said ground plate and said box compartment thereabove; and a plurality of hydraulic lifting devices for separately raising and lowering each of the front and rear ends of said elongated main frame relative to the ground, each of said plurality of hydraulic lifting devices comprising a ground-engaging base, a vertical cylinder, and a lifting arm which is fixedly attached to said main frame, said lifting devices functioning to lower said main frame so that both the front and rear ends thereof are in contact with the ground, thereby positioning the transfer station in an operational mode, and to lift both the front and rear ends of said elongated main frame above the ground such that the transfer station is in a transport mode, said transfer station having no elements that extend below said elongated main frame when in said operational mode.

2. A transfer station as defined in claim 1, including three of said hydraulic lifting devices, one of which is fixedly attached to said front end of said elongated main frame and two of which are fixedly attached to said rear end of said elongated main frame.

3. A transfer station as defined in claim 2, including a secondary frame mounted on said main frame, said secondary frame extending upwardly from said elongated main frame at an acute angle and having a free end located beyond said rear end of said elongated main frame, wherein said crusher mechanism is located above said secondary frame, and including a connecting belt moving along said secondary frame to carry crushed material from said crusher mechanism.

4. A transfer station as defined in claim 1, wherein each box compartment includes a floor, an outer side wall and a plurality of support arms which are pivotally connected to the elongated main frame to pivot about an axis extending in parallel with said elongated main frame.

5. A transfer station as defined in claim 4, wherein each feeder device includes a plurality of guide blocks which are positioned between its support arms and which are pivotally connected to the elongated main frame, said guide blocks having upper generally flat surfaces to enable debris from the associated box compartment to slide thereover when the associated box compartment is in a tilted orientation, and a curved retainer surface which faces away from the elongated main frame to help retain debris in the associated box compartment when in its non-tilted orientation.

6. A transfer station as defined in claim 5, wherein the box compartment of each feeder device includes a plurality of curved lock arms which extend below said support arms and which have holes therein to enable pins to be inserted therethrough and into corresponding holes in said guide blocks to lock said box compartments in their tilted orientations.

7. A transfer station as defined in claim 2, wherein each of said box compartments has open front and rear ends, and including ramps for positioning on the ground adjacent the front and rear ends of each box compartment when in its non-tilted orientation to enable a dump truck to drive up onto the floor of the respective box compartment from either direction, dump its load of debris, and then drive out of the box compartment in the same direction.

* * * * *